No. 877,512. PATENTED JAN. 28, 1908.
W. T. MAXWELL.
ANTISLIPPING DEVICE FOR TIRES.
APPLICATION FILED JUNE 25, 1906.
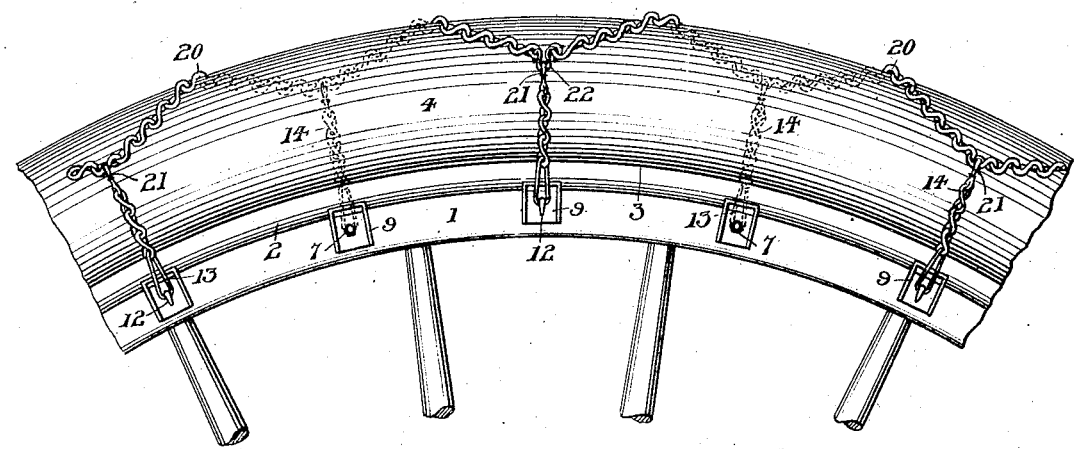
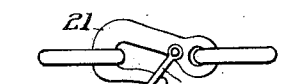
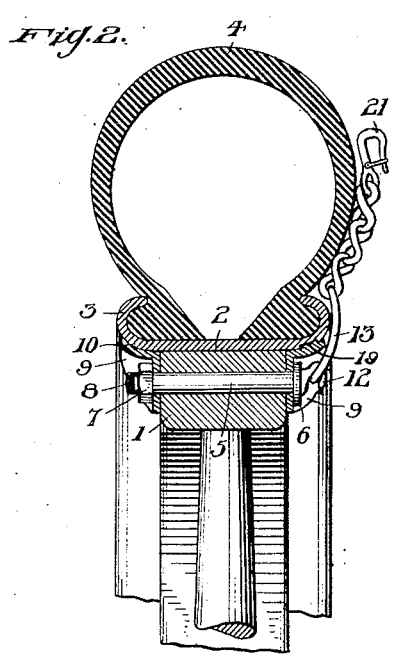
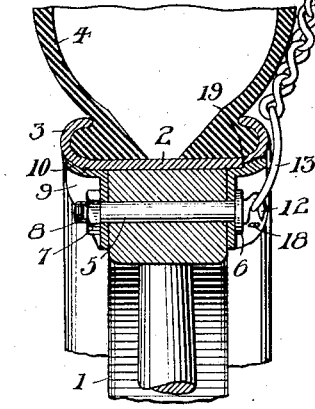
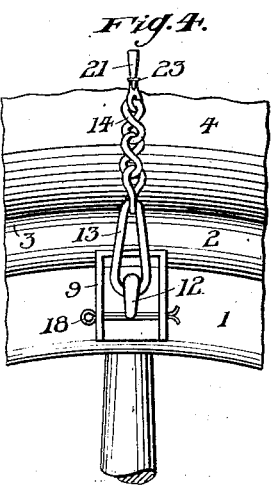
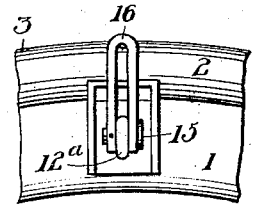
Witnesses:
Inventor
William T. Maxwell
By
Attorneys

UNITED STATES PATENT OFFICE.

WILLIAM T. MAXWELL, OF PITTSBURG, PENNSYLVANIA, ASSIGNOR OF ONE-HALF TO GEORGE W. EBERHARDT, OF PITTSBURG, PENNSYLVANIA.

ANTISLIPPING DEVICE FOR TIRES.

No. 877,512.  Specification of Letters Patent.  Patented Jan. 28, 1908.

Application filed June 25, 1906. Serial No. 323,264.

*To all whom it may concern:*

Be it known that I, WILLIAM T. MAXWELL, a resident of Pittsburg, in the county of Allegheny and State of Pennsylvania, have invented a new and useful Improvement in Antislipping Devices for Tires; and I do hereby declare the following to be a full, clear, and exact description thereof.

This invention relates to means for preventing the slipping of wheels of motor vehicles and the like, and its object is to provide an arrangement of chains for this purpose which will prevent the wheel from slipping both under the driving force of the motor and also sidewise in rounding corners and the like.

A further object is to provide an arrangement of chains which is cheap in its original cost, not liable to derangement or breakage, and which can be easily taken off and repaired at a minimum cost and with a minimum amount of labor.

Many prior devices comprising arrangements of chains for overcoming the slipping of the wheels of motor vehicles have been devised, but most of these have been rather complicated, and have either been liable to derangement or breakage or else have been of such a nature that they are expensive to repair in case of breakage or when worn out, one serious difficulty being that they are so constructed that they can be repaired only by a skilled mechanic.

This invention is intended to overcome the foregoing difficulties, and it consists in the arrangement of chains and fastening means hereinafter described, and particularly in an arrangement which permits the use of an ordinary standard chain for the tread portion, and held in place in such a manner that it can be readily applied or taken off by any person.

In the accompanying drawings, Figure 1 is a side view of a portion of a vehicle wheel showing my invention applied thereto; Fig. 2 is a cross section through the felly, metal rim member and tire; Fig. 3 is a similar cross section showing a modification; Fig. 4 is a side view of the same; Figs. 5 and 6 are detailed views showing another modification; Fig. 7 is a perspective view of the brace; and Fig. 8 is a detail view of one of the hooks.

My invention can be applied to a vehicle wheel of any type. In the drawings it is shown applied to one form of motor vehicle wheel, the same comprising a rim composed of a wooden felly 1, and metal rim member 2. The rim member 2 is shown as of a well known type, having the downwardly and inwardly curve edge portions 3. Applied to the metal rim member 2 is a tire 4, which is shown of the split pneumatic type.

Secured to the rim at intervals are chain attaching means, said means comprising bolts 5, which extend through the felly 1, and at one end being provided with a head 6, and at their opposite ends being threaded for receiving the fastening nut 7 and cotter pin 8. These bolts pass through suitable bracing members 9 on each side of the felly, said bracing members comprisng a curved inclined bottom web 10, adapted to engage the curved side portions of the metal rim member 2, and stiffening and strengthening side webs 11. These brace members are clamped against the side faces of the felly between the head 6 and nut 7, and serve not only as washers or wearing members for the bolts 5, but also prevent the felly from slipping sidewise on the metal rim member, the latter function being secured by reason of the curved lower faces of these brace members. engaging the curved inclined side portions 3 of the metal rim member 2, as will be readily apparent. These securing bolts at one end are provided with suitable attaching means, shown in Figs. 1 to 4, as a hook 12, which is engaged by a link 13, which extends outwardly, and is curved so as to pass over the edge of the metal rim member 2, said link in turn having connected thereto a short piece of chain 14. In Figs. 5 and 6, I have shown a modification in which in place of the open hook 12, the bolt is provided with an eye or closed hook $12^a$, which is engaged by a pin 15 of a clevis 16 on the chain 14. Figs. 3, 4 and 7 show the side webs 11 of the brace member 9 extended and provided with openings for receiving a cotter pin 18, or other similar means which prevents the link 13 from becoming accidentally disengaged from the hook 12.

One or both of the brace members 9 may be provided, if desired, with a lug or stud 19 to enter a suitable depression or recess in the metal rim member 2, said lug serving as an additional means to prevent sidewise movement of the felly on the metal rim member. The hooks 12 or eyes 12ª, and short chain sections 14, are arranged alternately on the opposite sides of the wheel rim, and consequently in staggered relation to each other, as shown in Fig. 1. Each of the chain members 14 extends outwardly close to the tread of the tire 4, and terminates in a suitable hook for engaging the chain member 20, which lies on the tread portion of the wheel and is the part of the anti-slipping device which receives the wear. This chain 20 may be a standard chain of any suitable type, such as can be bought in any hardware store. It is a continuous length, extending entirely around the wheel in a zigzag course, being attached alternately to the hooks on the chain members 14 on the opposite sides of the wheel. All of the hooks, except one, are single hooks 21 such as shown in Fig. 8, these being arranged to hook into a link of the chain 20. One of the hooks, however, is double, as shown at 22, this being placed to receive the ends of the chain 20. All of these hooks have contracted openings to prevent the chain 20 from becoming accidentally disengaged. If desired, a retaining link 23 may be attached to the hook, and pass over the end of the hook, the latter being formed of spring metal, and having a slight outward curve at its end to hold said retaining link in place.

The chain member 20 is the part which receives the wear, and preferably this is a heavier chain than the connecting chains 14. This chain member 20 is so secured in place that it can be readily replaced and removed in case of breakage, and by an unskilled person. This is accomplished by connecting one end of the chain links to one member of the double hook 22, and then passing said chain alternately back and forth across the tread of the tire, and connecting links thereof in the hooks 21, and securing the other end of the chain on the other member of the double hook 22. This work can be done by any unskilled person without the use of special tools, so that even in case of breakage out in the country, it is easy to repair the same by applying at the nearest hardware store for a piece of suitable chain.

The chain members 14 are not subjected to wear and cannot be easily broken. The hooks 12 are protected by the projecting edge of the metal rim member 2, and the links 13 are practically the only parts which receive any hard blows from curbs, cobbles or the like, but obviously these are not readily liable to fracture. The entire equipment contains no part which is liable to work loose. The nuts 7 can be of any well known locked type, or may be held against coming off by any of the well known means, such as the cotter pins 8. If desired the tire may be protected from the chain by a band of leather or the like placed over the tread of the tire and fastened to the hooks.

What I claim is:

1. An anti-slipping device for tires comprising in combination, a series of securing means on the rim arranged alternately on opposite sides and in staggered relation, a chain member connected to each of said securing means and extending outwardly beyond the rim and ending in a hook, and a continuous chain extending in zigzag manner over the tire face and having links thereof engaging said several hooks.

2. An anti-slipping device for tires comprising in combination, a series of securing means on the rim arranged alternately and in staggered relation on opposite sides thereof, a chain member connected to each of said securing means and extending outwardly beyond the rim and ending in a hook, the hook on one of said chain members being double, and a continuous chain extending in zigzag manner over the tire face and having its ends attached to the two members of the double hook and other links attached to the hooks of the other chain members.

3. An anti-slipping device for tires comprising in combination, a series of securing means on the rim arranged alternately on opposite sides thereof and in staggered relation, a chain member connected to each of said securing means and extending outwardly beyond the rim and ending in a hook, and a heavier continuous chain extending in zigzag manner over the tire face and having links thereof engaging said several hooks.

4. An anti-slipping device for tires comprising in combination, a series of securing means on the rim arranged alternately on opposite sides and in staggered relation, a chain member connected to each of said means and extending outwardly beyond the rim, and a continuous chain extending in a zigzag course over the tire face and secured to said chain members alternately on opposite sides of the tread.

5. An anti-slipping device for tires comprising in combination, a series of bolts passing through the felly, a chain member connected to each of said bolts but located alternately on opposite sides of the rim and extending outwardly beyond the rim and a continuous chain extending in a zigzag course over the tire face and secured to said chain members alternately on opposite sides of the tread.

6. An anti-slipping device for tires comprising in combination, a series of bolts passing through the felly, braces at each end of said bolts and held in place thereby, said braces being provided with inclined faces which engage the inclined portions of the metal rim member, chain securing means connected to each of said bolts but alternately on opposite sides of the rim, and a continuous chain extending in zigzag course over the tire face and connected to said chain securing means alternately on opposite sides of the tread.

In testimony whereof, I the said WILLIAM T. MAXWELL have hereunto set my hand.

WILLIAM T. MAXWELL.

Witnesses:
F. W. WINTER,
ROBERT C. TOTTEN.